(12) United States Patent
Roberts et al.

(10) Patent No.: US 8,610,882 B2
(45) Date of Patent: Dec. 17, 2013

(54) ELONGATE STRUCTURE CURVATURE SENSING DEVICE

(75) Inventors: Richard Damon Goodman Roberts, Southampton (GB); Mark Volanthen, Fareham (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 501 days.

(21) Appl. No.: 12/445,555

(22) PCT Filed: Oct. 22, 2007

(86) PCT No.: PCT/GB2007/050649
§ 371 (c)(1),
(2), (4) Date: Feb. 4, 2010

(87) PCT Pub. No.: WO2008/047171
PCT Pub. Date: Apr. 24, 2008

(65) Prior Publication Data
US 2010/0134782 A1 Jun. 3, 2010

(30) Foreign Application Priority Data

Oct. 20, 2006 (GB) .................................. 0620944.9

(51) Int. Cl.
*G01B 11/16* (2006.01)
(52) U.S. Cl.
USPC ............................................. 356/32; 356/34
(58) Field of Classification Search
USPC .................................................... 356/32, 34
See application file for complete search history.

(56) References Cited

U.S. PATENT DOCUMENTS

| 4,275,599 | A | * | 6/1981 | Kohlenberger et al. ......... 73/774 |
| 4,793,189 | A | | 12/1988 | Dell'Orto et al. |
| 4,806,012 | A | * | 2/1989 | Meltz et al. ...................... 356/32 |
| 5,946,094 | A | * | 8/1999 | Sahlgren et al. ............... 356/477 |
| 6,799,469 | B2 | * | 10/2004 | Demia et al. ...................... 73/766 |
| 7,646,945 | B2 | * | 1/2010 | Jones et al. ...................... 385/13 |
| 7,720,322 | B2 | * | 5/2010 | Prisco ............................. 385/12 |

(Continued)

FOREIGN PATENT DOCUMENTS

| EP | 1672344 A1 | 6/2006 |
| WO | 9625584 A1 | 8/1996 |
| WO | 0206781 A1 | 1/2002 |

OTHER PUBLICATIONS

Written Opinion and International Search Report for PCT Application Serial No. PCT/GB2007/050649/ dated Jan. 29, 2008.

*Primary Examiner* — Roy M Punnoose
(74) *Attorney, Agent, or Firm* — Brandon S. Clark

(57) ABSTRACT

A curvature sensing device 10 comprising, a first fiber Bragg grating (FBG) strain sensor 12, a second FBG strain sensor 14, a flexible piece comprising two end pieces 16, 18 joined by a tubular mid-section 20. The device 10 further comprises 16 contact rollers 22 provided on the internal surfaces of the end pieces 16, 18, which maintain the end pieces 16, 18 tangential to a pipe around which the device 10 is located. The FBG strain sensors 12, 14 are embedded within the mid-section 20 and are arranged in two generally orthogonal planes, so that the curvature is measured in two dimensions. This enables the device 10 to detect both the magnitude and direction of bending/curvature within a pipe. Bending in a pipe is transferred through the end pieces 16, 18 to the mid-section 20. The FBG sensors 12, 14 measure bending of the mid-section 20 from which bending of the pipe can be inferred.

28 Claims, 10 Drawing Sheets

(56) References Cited

U.S. PATENT DOCUMENTS

| | | |
|---|---|---|
| 7,752,920 B2 * | 7/2010 | Blumenkranz et al. .. 73/862.045 |
| 2006/0045408 A1 * | 3/2006 | Jones et al. .................... 385/12 |
| 2007/0156019 A1 * | 7/2007 | Larkin et al. .................. 600/104 |
| 2007/0255424 A1 * | 11/2007 | Leydet et al. ................... 623/24 |
| 2011/0226070 A1 * | 9/2011 | Berendes et al. .......... 73/862.55 |

* cited by examiner

ELONGATE STRUCTURE CURVATURE SENSING DEVICE

BACKGROUND

1. Field of the Invention

The invention relates to an elongate structure curvature sensing device.

2. Description of Related Art

Current pipe survey methods included position measurement using remotely operated vehicles (ROV) or autonomous underwater vehicles with acoustic positioning technology based on the time of flight of sound pulsed through water. Other methods include side-scan sonar from an ROV or a vessel. All of these techniques obtain a measurement of the pipe position at a number of locations. When deriving bending stress from the position information, the high level of noise on the position measurement equates to a very high level of noise on the derived bending measurement and it is widely known that position measurement can not be used to provide accurate measurements of bending in installed pipelines.

Other techniques to measure the stresses in installed pipelines include intelligent pigs, devices with measurement capability that are sent along the inside of the pipeline. Pigs with instruments to measure acceleration have been used to try an measure bending stresses and shapes of pipelines, but again processing acceleration measurements to obtain bending stresses generates significant errors.

BRIEF SUMMARY

According to a first aspect of the invention there is provided an elongate structure curvature sensing device comprising:
  first and second strain sensors; and
  a flexible piece comprising at least two engagement sections which are adapted to substantially tangentially engage an elongate structure and are joined by at least one mid-section adapted to bend with the elongate structure, the first and second strain sensors being mechanically coupled to the mid-section in generally orthogonal planes and having their measurement axes arranged generally lengthways along the mid-section, wherein the flexible piece is adapted for insertion into or fastening around an elongate structure and for movement along an elongate structure, such that it will flex as the curvature of the elongate structure changes.

The curvature sensing device provides a direct means for measuring bending stresses along elongate structures, such as pipelines, curvature in an elongate structure being transferred through the engagement sections to the mid-section of the sensing device, causing the mid-section to bend and take on the curvature of the elongate structure, the bending being detected by the strain sensors. It can be deployed within a pipeline or it can be deployed around the outside of a pipeline. The provision of two generally orthogonally located strain sensors means that as an elongate structure moves past the curvature sensing device, or vice versa, the curvature (bending) of the elongate structure is detected in 2 orthogonal directions, allowing both the bending magnitude and direction to be determined. The device is adapted to move along an elongate structure but can also monitor curvature at a fixed position following initial movement along the elongate structure to that position.

The curvature sensing device may further comprise a third strain sensor, provided outside the planes of the first and second strain sensors.

The curvature sensing device can thereby measure curvature/bending in three dimensions.

The strain sensors are preferably optical fibre strain sensors, and most preferably fibre Bragg grating strain sensors. The strain sensors may be provided on the surface of the mid-section or may be embedded within the mid-section.

The strain sensors are preferably provided at positions off-set from the central longitudinal axis of the curvature sensing device. The strain sensors will thereby be exposed to larger strains and the difference between the strains experienced by each strain sensor will be greater than if there were centrally located, making the device more sensitive.

Preferably, the mid-section is flexible relative to the engagement sections.

The mid-section may comprise a strain sensor carrier tube, the strain sensors being arranged generally lengthways along the carrier tube. The mechanical properties of the strain sensor carrier tube may vary along its length. In particular, the thickness of the wall of the tube may vary along its length. Alternatively or additionally, the strain sensor carrier tube may have one or more apertures provided therein, to thereby effectively vary the width of the tube along its length. The mid-section may alternatively comprise an elongate strain sensor carrier bar. The strain sensors are preferably provided in two orthogonal planes of the strain sensor carrier bar. The curvature sensing device may comprise a plurality of mid-sections, the first strain sensor being provided in a first plane of a first bar and the second strain sensor being provided in a generally orthogonal plane of a second bar.

The mechanical properties of the or each strain sensor carrier bar may vary along its length, and in particular the cross-sectional size and/or shape of the or each strain sensor carrier bar may vary along its length.

Alternatively or additionally, the material proprieties, such as the modulus of elasticity, of the or each strain sensor carrier bar or strain sensor carrier tube may vary along its length.

Use of a carrier bar instead of a carrier tube can allow the strain experienced by the strain sensors to be reduced in high strain situations, for example when a large degree of bending occurs and high bending stresses are produced, thus protecting the strain sensors from strain levels which may damage them.

Varying the mechanical and/or material properties of the mid-section allows the strain/bend radius ratio to be regulated, by selecting the mechanical proprieties of the mid-section to transfer the required amount of strain to the location of the strain sensors.

The or each mid-section is preferably comprised of a flexible fibre reinforce composite material, and most preferably a glass fibre reinforced epoxy composite material.

Preferably, at least one mid-section is arranged for longitudinal movement relative to at least one of the engagement sections whereby to reduce the stress experienced by the mid-sections when in regions of high curvature. As the elongate structure bends, the or each mid-section thereby follows the shape of the elongate structure but bends about their own neutral axis rather than that of the elongate structure. This reduces the amount of strain experienced by the strain sensors.

The engagement sections preferably engage the elongate structure over a length at least equal to the diameter of the elongate structure. The engagement sections thereby fixes the ends of the curvature sensing device relative to the elongate structure.

The engagement sections are preferably of circular cross-section. The curvature sensing device preferably further comprises a plurality of elongate structure interface pieces which provide the surface of the curvature sensing device that engages the elongate structure. The interface pieces act to ensure that the rigid sections remain tangential to the elongate structure.

The curvature sensing device preferably comprises at least two elongate structure interface pieces on each engagement section. Two interface pieces on each engagement section enables the curvature sensing device to follow bending in two dimensions, while at least three interface pieces on each engagement section enables the device to follow bending in three dimensions.

Preferably, at least one of the interface pieces comprises a wheel, ball bearing or other low friction component. At least one of the interface pieces is preferably configured to resiliently bias the curvature sensing device against a surface of the elongate structure. The rigid sections are therefore retained pushed against the same side of the elongate structure, thereby improving the accuracy of the curvature measurement. Preferably, where 4 interface pieces are provided, the interface pieces are substantially equally spaced and arranged in two sets of opposing pairs, one interface of each pair being configured to resiliently bias the curvature sensing device against a surface of the elongate structure.

The curvature sensing device may alternatively or additionally comprise at least one further sensing device, which measures the location and/or the orientation of the curvature sensing device, in absolute or relative terms.

The curvature sensing device may comprise at least two parts which are mutually releasably attachable to secure the sensing device around the outside of an elongate structure. This enables the curvature sensing device to be located around an elongate structure at a point along its length, which can be advantageous where it is not possible to install or remove the curvature sensing device from an end of the elongate structure.

The curvature sensing device may be intended for use around the outside of an elongate structure, and encloses less than the complete cross-sectional perimeter of the structure. The curvature sensing device can therefore be used on elongate structures where it is not possible to access the whole way round the structure because something is in the way, for example the seabed.

The elongate structure may be a pipeline or cable. The curvature sensing device is preferably adapted for use with underwater pipes or cables.

The curvature sensing device may further comprise fixing means adapted to fix the device to an elongate structure at a desired location.

According to a second aspect of the invention there is provided a method for measuring the curvature of an elongate structure, the method comprising:
  providing at least one curvature sensing device comprising at least two engagement sections which are adapted to substantially tangentially engage an elongate structure and are joined by at least one mid-section adapted to bend with the elongate structure, the first and second strain sensors being mechanically coupled to the mid-section in generally orthogonal planes and having their measurement axes arranged generally lengthways along the mid-section, wherein the flexible piece is adapted for insertion into or fastening around an elongate structure and for movement along an elongate structure, such that it will flex as the curvature of the elongate structure changes; and
  causing relative movement between the curvature sensing device and the elongate structure and measuring a signal from the strain sensors indicative of the strain on the strain sensors due to the flexing of the flexible piece.

The method may further comprise causing the said relative movement and measuring the signals from the strain sensors to determine the position of maximum curvature of an elongate structure, fixing the location of the curvature sensing device at the position of maximum curvature and measuring the signals from the strain sensors to monitor the curvature of the elongate structure at the position of maximum curvature.

BRIEF DESCRIPTION OF THE DRAWINGS

Embodiments of the invention will now be described, by way of example only, with reference to the accompanying drawings, in which.

DETAILED DESCRIPTION

Figure 1:
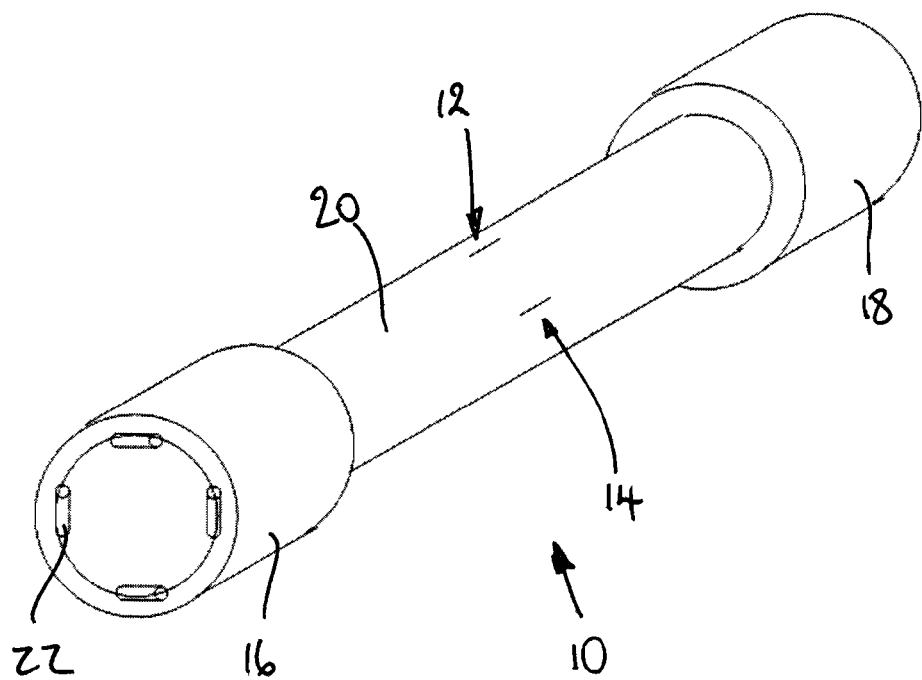
FIG. 1 is a diagrammatic representation of a curvature sensing device according to a first embodiment of the invention.

Referring to FIG. 1 a curvature sensing device 10 comprising, a first fibre Bragg grating (FBG) strain sensor 12, a second FBG strain sensor 14, a flexible piece comprising two engagement sections in the form of end pieces 16, 18 joined by a tubular mid-section 20. In this example, the curvature sensing device 10 is intended for use around the outside of a tubular pipe.

In this example, the material of the mid-section 20 is more flexible that the material of the end pieces 16, 18. The end pieces 16, 18 have a fixed relationship with an elongate structure while the mid-section 20 is adapted to conform to and bend with the elongate structure.

The end pieces 16, 18 comprise circular section tubular elements. The tubular mid-section 20 comprises a glass fiber/epoxy composite material. The device 10 further comprises contact points 22, which is this example take the form of 16 contact rollers 22, which maintain the end pieces 16, 18 tangential to a pipe around which the device 10 is located. The contact rollers 22 are provided on the internal surfaces of the end pieces 16, 18, for contact with the external surface of the pipe. The contact rollers 22 are arranged in two spaced sets of four on each end piece 16, 18, each set being substantially equally spaced around the internal surface of the respective end piece 16, 18.

The FBG strain sensors 12, 14 are embedded within the mid-section 20 and are arranged with their measurement axes extending along the length of the mid-section 20 (the lines in the drawing indicate the position of the FBG sensors 12, 14 and it will be appreciated that the FBG sensors 12, 14 are provided within a length of optical fibre to enable optical interrogation of the FBG sensors 12, 14). The FBG sensors 12, 14 are located within two generally orthogonal planes, so that the curvature is measured in two dimensions, and the measurement planes are off-set from the central longitudinal axis of the device 10. This enables the device 10 to detect both the magnitude and direction of bending/curvature within a pipe, and maximises the strains experienced by the FBG sensors 12, 14.

Bending in a pipe is transferred through the end pieces 16, 18 to the mid-section 20. The FBG sensors 12, 14 measure bending of the mid-section 20 from which bending of the pipe can be inferred.

Figure 2:
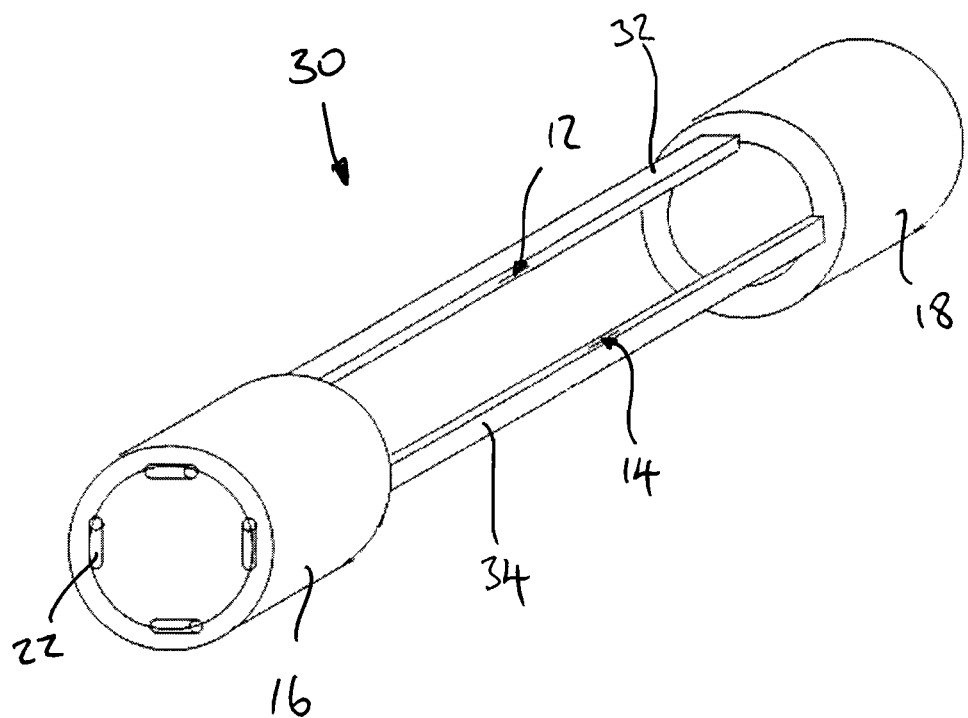
FIG. 2 is a diagrammatic representation of a curvature sensing device according to a second embodiment of the invention.

A curvature sensing device 30 according to a second embodiment is shown in FIG. 2. The sensing device 30 of this embodiment is substantially the same as the device 10 of the first embodiment, with the following modifications. The same reference numbers are retained for corresponding features.

In this embodiment the device 30 comprises two mid-sections, in the form of first and second carrier bars 32, 34, one to measure bending in each orthogonal direction by appropriate location of the FBG strain sensors 12, 14 on the carrier bars. The carrier bars 32, 34 comprise rectangular section bars fabricated from a flexible fibre reinforced composite material. The first FBG strain sensor 12 is provided on a first side (in a first plane) of the first bar 32 and the second FBG strain sensor 14 is provided on a generally orthogonal side (and thus in a generally orthogonal plane) of the second bar 34. The carrier bars 32, 34 are off-set from the central longitudinal axis of the device 30, and thus the FBG sensors 12, 14 are similarly off-set.

The carrier bars 32, 34 only occupy part of the perimeter of a pipe around which the device 10 is intended to be used. Using two carrier bars 32, 34 that partially cover the perimeter of a pipe reduces the levels of bending stress within the carrier bars 32, 34 and thus in the FBG sensors 12, 14. This can be advantageous in applications where a high degree of bending occurs, for example during S-lay of pipelines, as will be discussed in more detail below.

The carrier bars 32, 34 are rigidly attached to one end piece 16 and attached to the other end piece 18 via a sliding mechanism. As the pipe bends, the carriers follow the shape of the pipe (as in the first embodiment), but they bend about their own neutral axis rather than that of the pipe. There must be some restraint to ensure the carrier bars 32, 34 are contact with the sliding end piece 18 at all times.

The carrier bars 32, 34 could alternatively be configured to slide at both ends.

Figure 3:
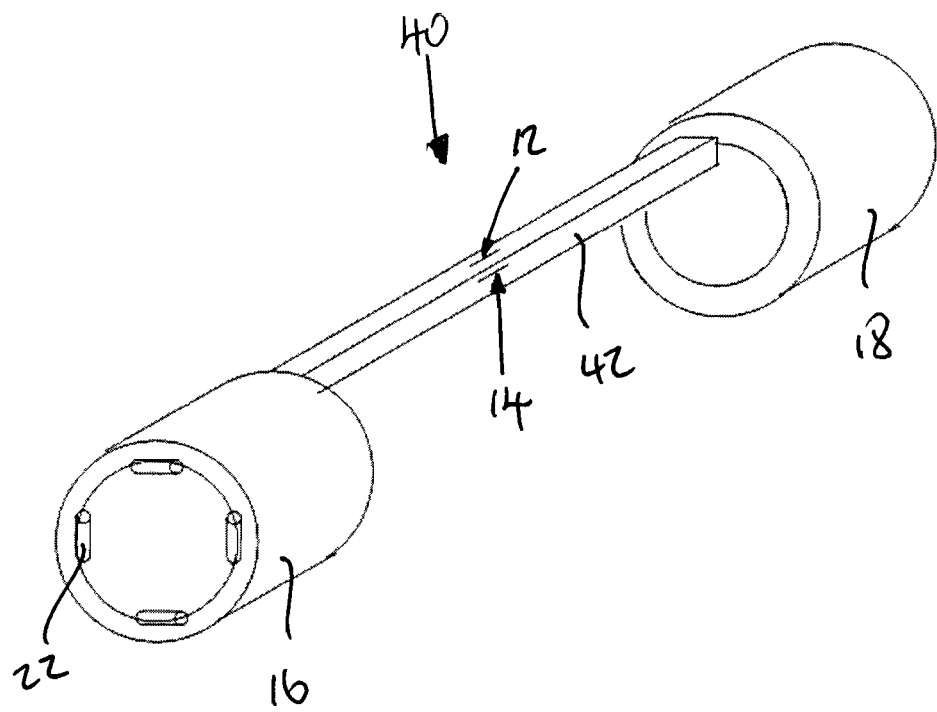
FIG. 3 is a diagrammatic representation of a curvature sensing device according to a third embodiment of the invention.

FIG. 3 shows a curvature sensing device 40 according to a third embodiment of the invention. The device 40 of this embodiment is substantially the same as the device 30 of the second embodiment, with the following modification. The same reference numbers are retained for corresponding features.

In this embodiment a single carrier bar 42 is provided, the FBG strain sensors 12, 14 being provided on generally orthogonal sides of the carrier bar 42. The carrier bar 42 is again off-set from the central longitudinal axis of the device 40.

Figure 4:
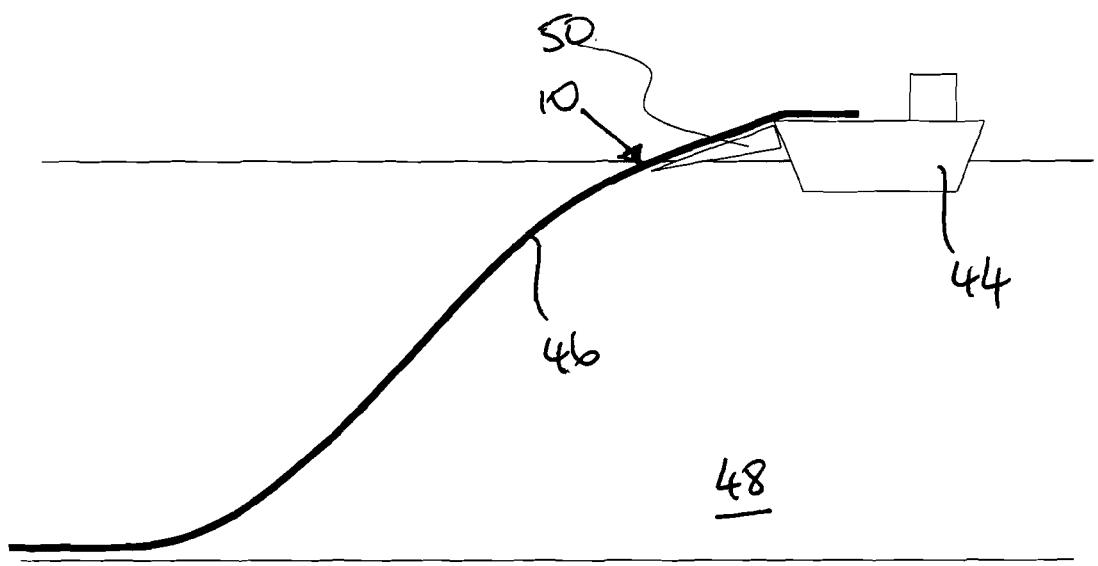
FIG. 4 is a diagrammatic representation of an off-shore pipeline laying vessel on which the curvature sensing device of FIG. 1 is provided.

Offshore pipelines are installed by a number of different methods including J-lay, S-lay and reel lay. A pipe installation using the S-lay method is shown in FIG. 4. As the lay vessel 44 moves along, pipe sections are welded together and lowered into the water behind the vessel. Large bending stresses can occur in the pipe 46 as it passes into the water 48 and a stinger 50 is often used to guide the pipe 46 off the back of the vessel and into the water to limit these stresses. Even with the use of stingers, the pipe is often bent so tightly that the bending stresses exceed the yield point of the material. Furthermore the level of bending stresses varies during the lay process due to wave motion, vessel motion and other factors including the water depth. It is of great interest to be able to monitor the level of stress induced in the pipe during the lay process to know whether design limits have been exceeded and whether there has been any reduction in the safe operating lifetime of the pipeline.

A curvature sensing device 10 is located in the region of the stinger 50 or just behind the stinger near the location of maximum bending and it can be tethered to the stinger of the vessel to remain at the desired measurement location. As the pipe 46 moves past, the device 10 makes measurements of bending in 2 orthogonal directions (equivalent also to a bending magnitude and direction). It will be appreciated that any of the devices 10, 30, 40 may be used in this application.

Figure 5:
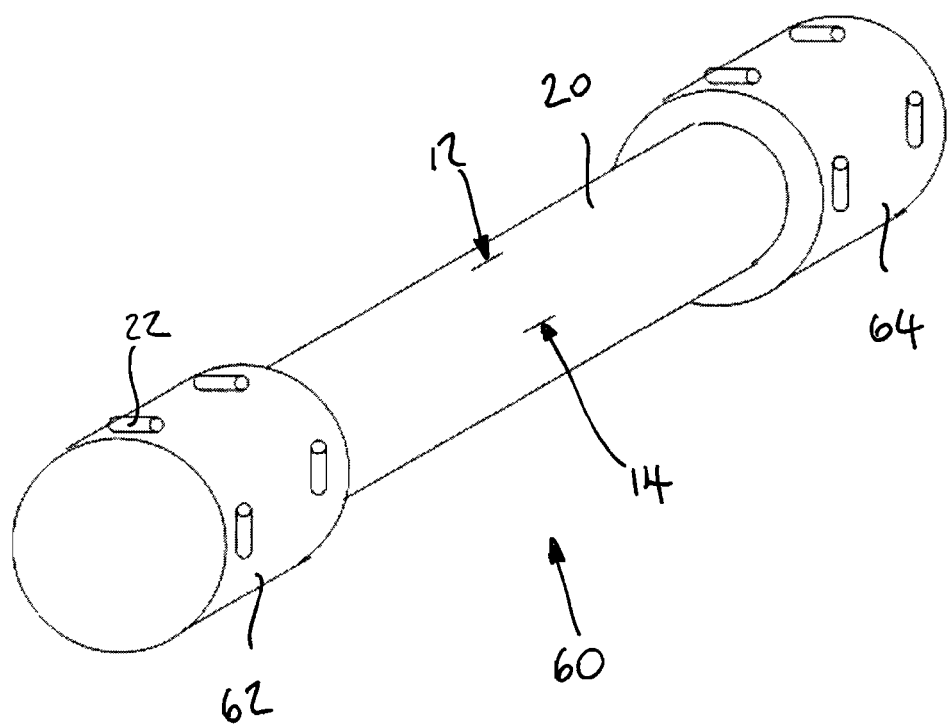
FIG. 5 is a diagrammatic representation of a curvature sensing device according to a fourth embodiment of the invention.
Figure 6:
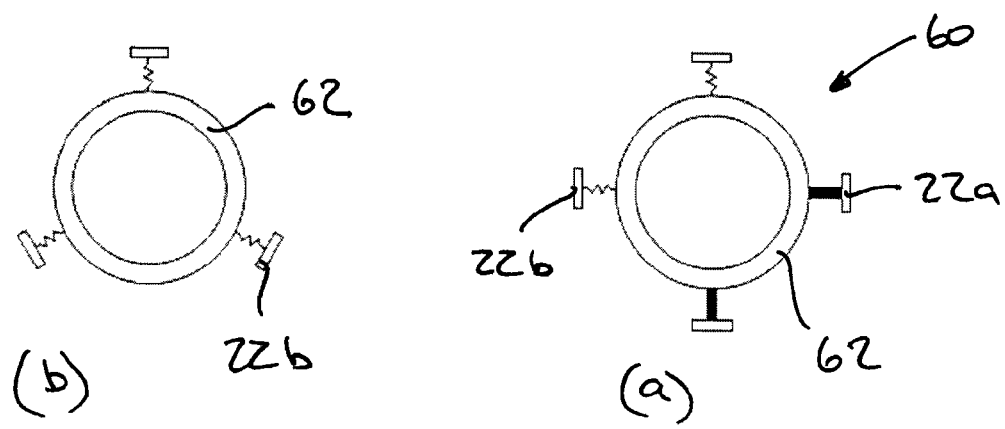
FIG. 6 shows diagrammatic end views of (a) the device of FIG. 5 and (b) the device of FIG. 5 having an alternative arrangement of rollers.
Figure 7:
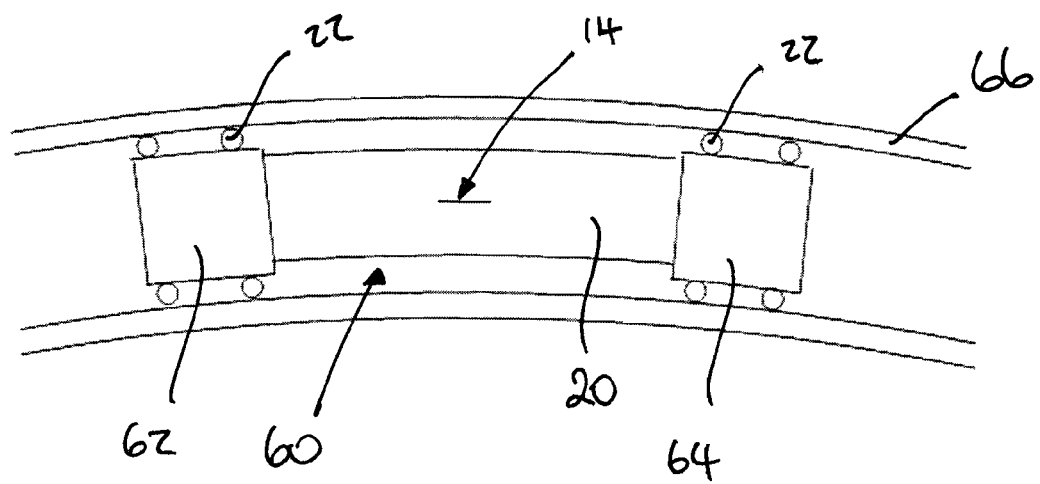
FIG. 7 is a diagrammatic representation of the curvature sensing device of FIG. 5 located within a pipeline.

A curvature sensing device 60 according to a fourth embodiment is shown in FIGS. 5 to 7. The sensing device 60 of this embodiment is substantially the same as the device 10 of the first embodiment, with the following modifications. The same reference numbers are retained for corresponding features. The device 60 of this embodiment is intended for use inside a tubular pipe, as depicted in FIG. 7.

In this embodiment the end pieces 62, 64 comprise circular section solid rod elements. The contact rollers 22 are provided in the external surfaces of the end pieces 62, 64 for contact with the internal surface of the pipe.

Four of the contact rollers 22a on each end piece 62, 64 are provided on fixed mountings and the other four contact rollers 22b are spring mounted. As shown in FIG. 6(a), each set of four contact rollers comprises two opposing sets each comprising one fixed contact roller 22a and one sprung contact roller 22b. This ensures that the end pieces 62, 64 are always pushed against the same side of the pipe, thereby improving the accuracy of the curvature sensing device 60.

As shown in FIG. 6(b), each end piece 62, 64 may alternatively be provided with two sets of three contact rollers 22, all of which are spring mounted contact rollers 22b.

FIG. 7 illustrates how the curvature sensing device 60 transfers and converts bending of a pipe 66 into bending of the tubular mid-section 20.

Figure 8:
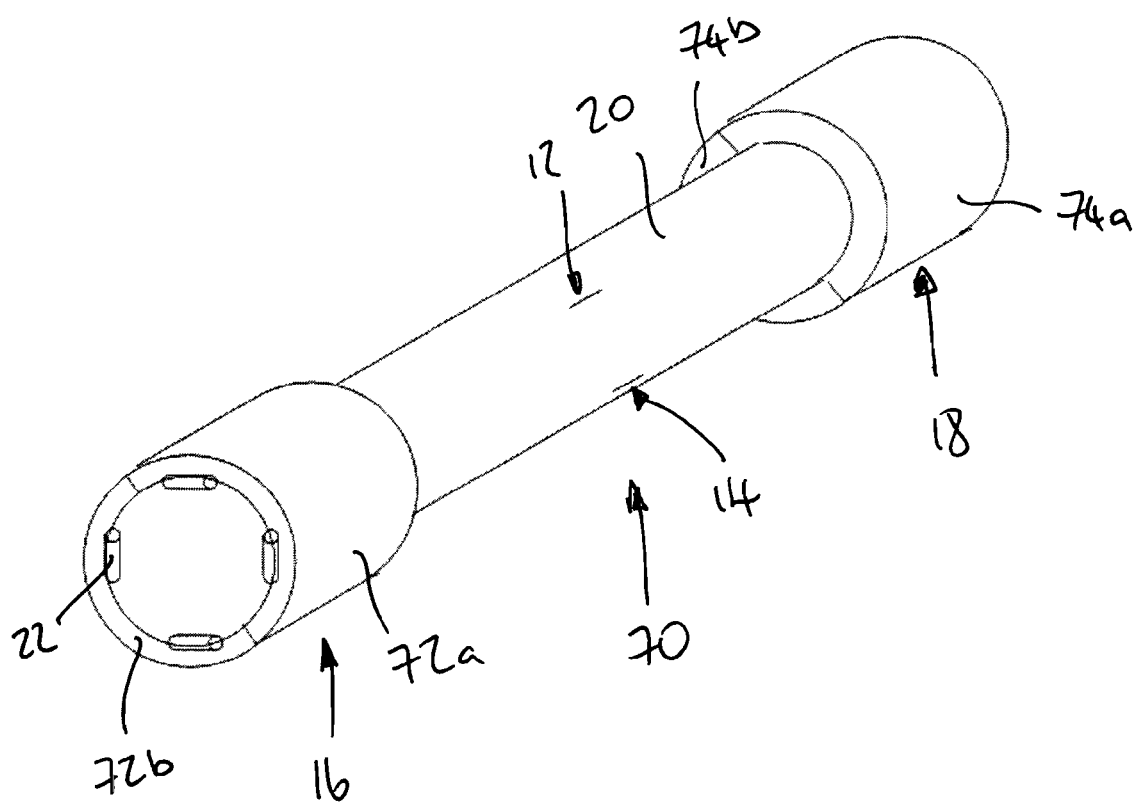
FIG. 8 is a diagrammatic representation of a curvature sensing device according to a fifth embodiment of the invention.

FIG. 8 shows a curvature sensing device 70 according to a fifth embodiment of the invention. The sensing device 70 of this embodiment is substantially the same as the device 10 of the first embodiment, with the following modifications. The same reference numbers are retained for corresponding features.

In this embodiment the end pieces 16, 18 comprise two half-cylindrical parts 72a, 72b, 74a, 74b and the tubular mid-section 20 comprises two half-cylindrical parts 76a, 76b. The end piece parts 72a, 72b and 74a, 74b are provided with a hinge or fixing bolts to secure them together around a pipe. This enables the device 70 to be divided, located around the outside of a pipe, and subsequently joined together around the pipe. The device 70 can therefore be used in situations where it may not be possible to install or remove it from an end of the pipe.

Figure 9:
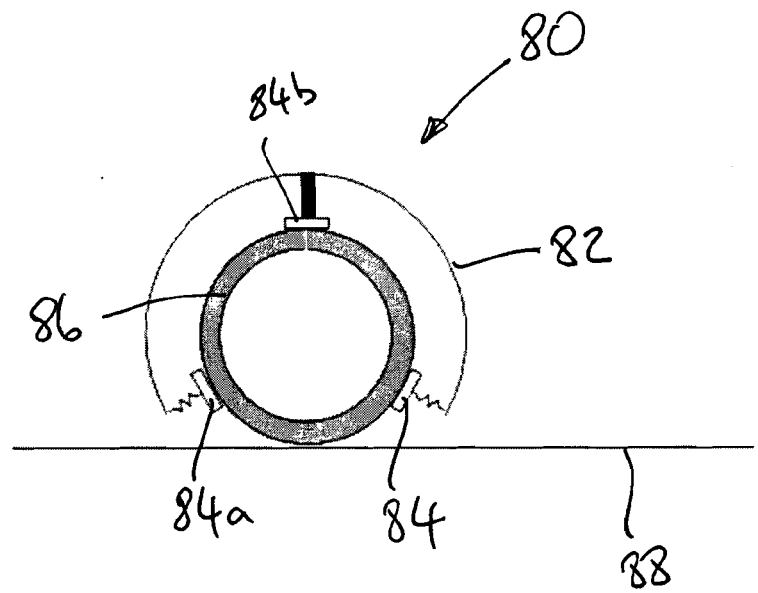
FIG. 9 is a diagrammatic end view of a curvature sensing device according to an sixth embodiment of the invention.

Referring to FIG. 9, a curvature sensing device 80 according to a sixth embodiment of the invention comprises first and second end pieces (only the first end piece 82 is shown in the drawing) interconnected by first and second carrier bars (not visible) of the same type as shown in FIG. 2.

The end pieces 82 comprise a part cylindrical tube, which extends for approximately ⅔rds of a circle in cross-section and thus around approximately ⅔rds of the external surface of a pipe 86. Three contact rollers 84 are provided on the internal surface of each end piece 82 and are substantially equally spaced around its internal surface. Two of the contact rollers 84 are sprung contact rollers 84a and the third (intermediate) contact roller is a fixed contact roller 84b.

The device 80 can thereby be used in situations where it is not possible to access the whole way around a pipe 86 because something is in the way, for example the seabed 88.

It will be appreciated that the end pieces 82 may further be hinged or split into multiple pieces for installation onto the pipe 86, in a similar manner to the previous embodiment.

Figure 10:
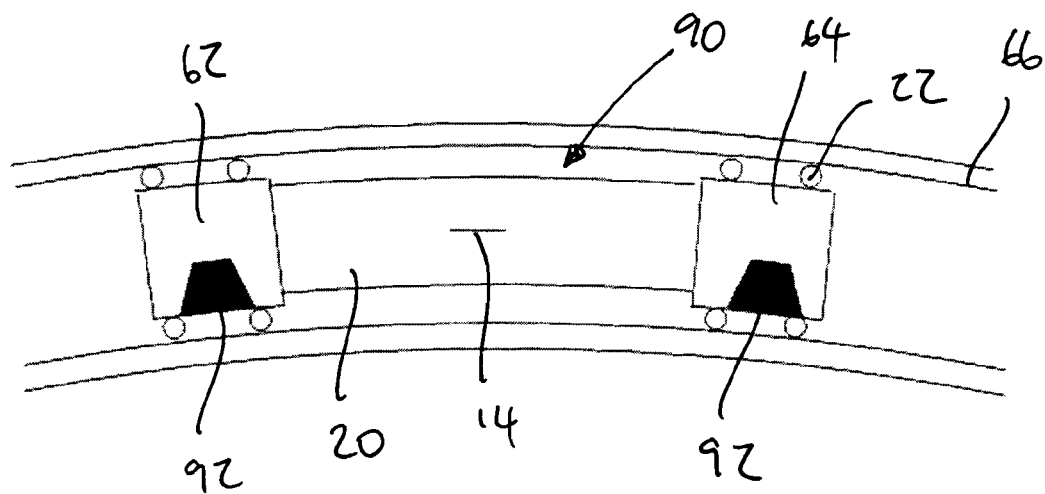
FIG. 10 is a diagrammatic representation of a curvature sensing device according to a seventh embodiment located within a pipeline.

FIG. 10 shows a curvature sensing device 90 according to a seventh embodiment of the invention. The device 90 of this embodiment is substantially the same as the device 60 of the first embodiment, as shown in FIGS. 5 and 7, with the following modifications. The same reference numbers are retained for corresponding features.

In this embodiment, the device 90 is further provided with weights 92 within the end pieces 62, 64. The presence of the weights maintains the alignment of the sensors 12, 14 in a desired orientation.

The alignment of the sensors 12, 14 may alternatively be allowed to vary, and the device 90 further comprising orientation measuring means such as an inclinometer.

The device 90 may further comprise FBG sensor measurement instrumentation, power supply and data storage means within the device 90, enabling remote operation of the device 90. An odometer may also be included in the device 90 to log the position of the device 90 along a pipe for each bending measurement.

Figure 11:
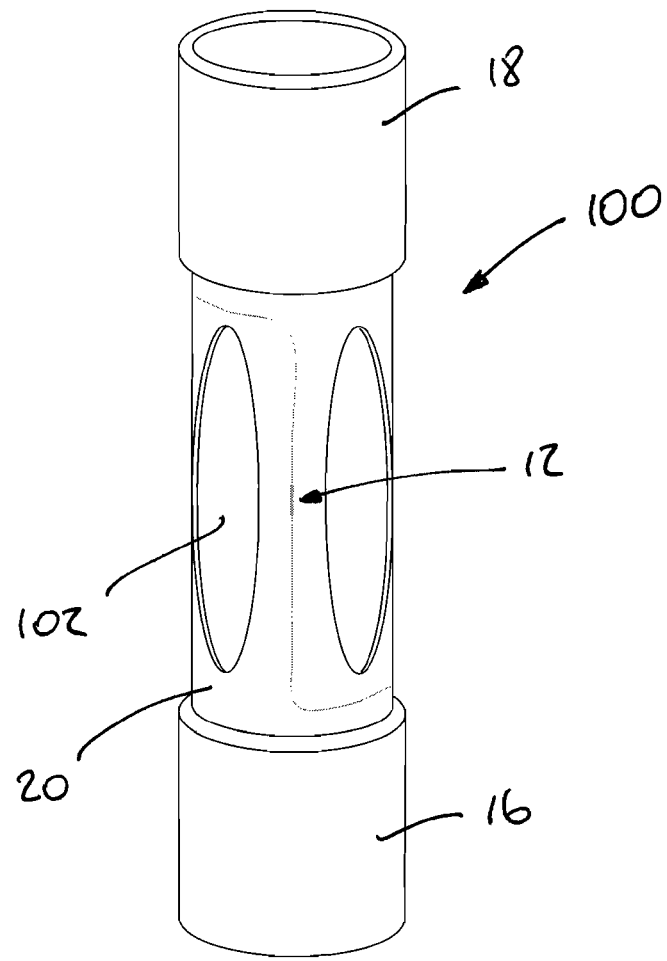
FIG. 11 is a diagrammatic representation of a curvature sensing device according to an eighth embodiment of the invention.

FIG. 11 shows a curvature sensing device 100 according to an eighth embodiment of the invention. The device 100 of this embodiment is substantially the same as the device 10 of the first embodiment, with the following modifications. The same reference numbers are retained for corresponding features.

In this embodiment, the tubular mid-section 20 has four generally elongate oval shaped apertures 102 (only two are visible in the drawing) provided in it. The apertures effective vary the width of the tubular mid-section 20 along its length, and thus its mechanical properties vary along its length. The effect of this is to regulate the amount of strain induced at the location of the strain sensors 12, 14 due to bending of an elongate structure being monitored, thus adjusting the strain/bend radius ratio.

Figure 12:
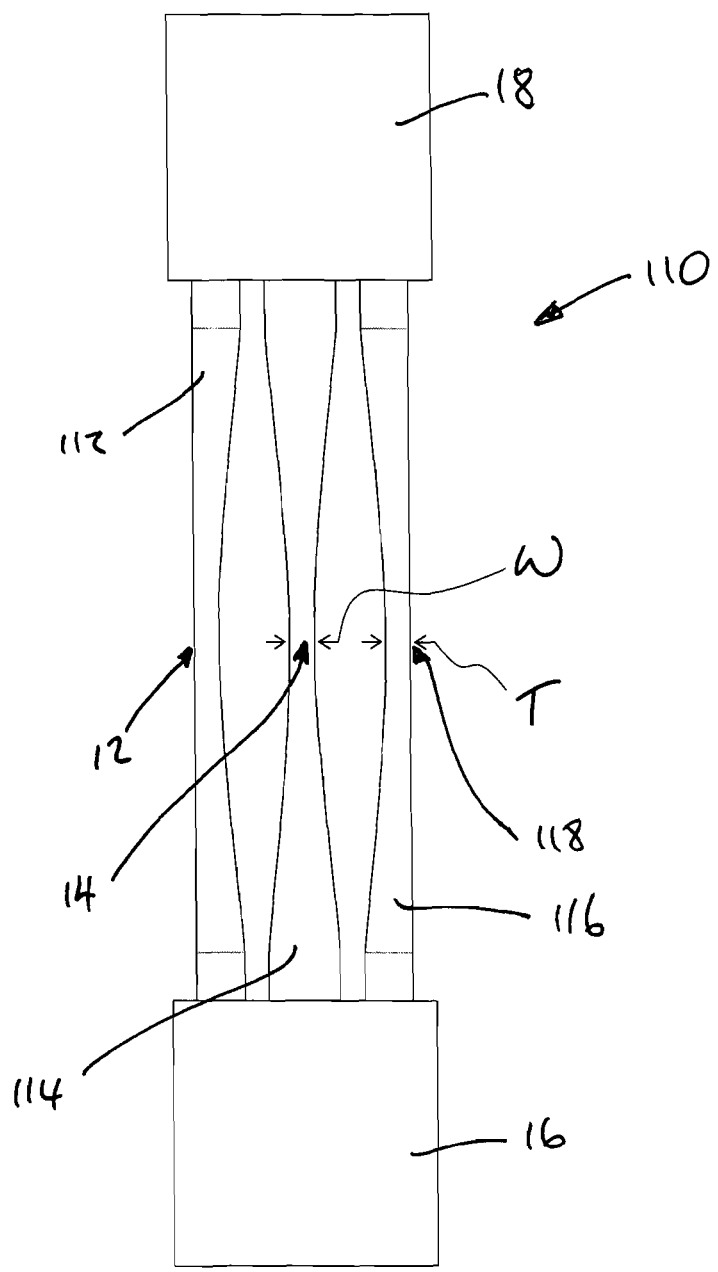
FIG. 12 is a diagrammatic representation of a curvature sensing device according to a ninth embodiment of the invention.

FIG. 12 shows a curvature sensing device 110 according to a ninth embodiment of the invention. The device 110 of this embodiment is substantially the same as the device 30 of the second embodiment, with the following modifications. The same reference numbers are retained for corresponding features.

In this embodiment, three strain sensor carrier bars 112, 114, 116 are provided. The mechanical properties of the carrier bars 112, 114, 116 vary along their length as a result of the cross-sectional size and shape reducing from their one ends toward their middles and increasing from their middles towards their other ends. Both the width (W) and the thickness (T) of the bars 112, 114, 116 varies along their lengths.

A third FBG strain sensor 118 is also provided, and is located outside the planes of the first and second FBG strain sensors 12, 14 but within the same axial plane. The device 110 can thereby measure bending/curvature in three dimensions.

Various modifications may be made without departing from the scope of the invention. For example, where a tubular mid-section is shown, one or more carrier bars may be used and vice versa. The carrier bars may be of a different sectional shape to those shown. Where the cross-sectional size and shape of the bars varies, a different variation may be used to that shown, to produce bars having a different profile. The thickness of the wall of tubular mid-sections may also be varied along their length, in addition to or in place of apertures in the wall. The engagement sections may be of the same material as the mid-section/s, the relative flexibility of the mid-section/s being created by varying the mechanical properties of the mid-section/s, or the engagement sections may be of a more rigid material than the mid-section/s.

The disclosed invention provides a direct method for measuring bending stresses along pipelines. The devices can be deployed within a pipeline, travel along the outside of the pipeline, or be fixed in position and have a pipeline travel through them. The devices can also be moved along an elongate structure to find the position of maximum curvature and then be fixed at that position to monitor the curvature of the structure there. The device may be provided with fixing means to enable its location to be fixed on the structure after it has been moved to the position of maximum curvature.

The curvature sensing device moves relative to a pipe and measures the bending distribution along a region of a pipe. Although embodiments describe use on a pipe, it is equally applicable to other slender structural members. The curvature sensing device of the present invention is applicable both to installed pipes and during the pipe installation process. The curvature sensing device is applicable to both subsea pipelines and pipelines on land.

The invention claimed is:

1. A pipe curvature sensing device comprising:
first and second strain sensors;
a flexible piece comprising at least two engagement sections which are adapted to substantially tangentially engage a pipe and are joined by at least one mid-section adapted to bend with the pipe, the first and second strain sensors being mechanically coupled to the mid-section in generally orthogonal planes and having their measurement axes arranged generally lengthways along the mid-section, wherein the flexible piece is adapted for insertion into or fastening around the pipe and for movement along the pipe, such that it will flex as the curvature of the pipe changes.

2. The pipe curvature sensing device as claimed in claim 1, wherein the curvature sensing device further comprises a third strain sensor, provided outside the planes of the first and second strain sensors.

3. The pipe curvature sensing device as claimed in claim 1, wherein the strain sensors are optical fibre strain sensors.

4. The pipe curvature sensing device as in claim 1, wherein the strain sensors are provided at positions off-set from the central longitudinal axis of the curvature sensing device.

5. The pipe curvature sensing device as claimed in claim 1, wherein, wherein the mid-section is flexible relative to the engagement sections.

6. The pipe curvature sensing device as claimed in claim 1, wherein, wherein the mid-section comprises a strain sensor carrier tube, the strain sensors being arranged generally lengthways along the carrier tube.

7. The pipe curvature sensing device as claimed in claim 6, wherein the mechanical properties of the strain sensor carrier tube vary along its length.

8. The pipe curvature sensing device as claimed in claim 6 or 7, wherein the strain sensor carrier tube has one or more apertures provided therein.

9. The pipe curvature sensing device as claimed in claim 1, wherein the mid-section comprises an elongate strain sensor carrier bar.

10. The pipe curvature sensing device as claimed in claim 9, wherein the curvature sensing device comprises a plurality of mid-sections, the first strain sensor being provided in a first plane of a first bar and the second strain sensor being provided in a generally orthogonal plane of a second bar.

11. The pipe curvature sensing device as claimed in claim 9 or 10, wherein the mechanical properties of the strain sensor carrier bar vary along its length.

12. The pipe curvature sensing device as claimed in claim 1, wherein the material proprieties, such as the modulus of elasticity, of the or each strain sensor carrier bar or strain sensor carrier tube vary along its length.

13. The pipe curvature sensing device as claimed in claim 1, wherein at least one mid-section is arranged for longitudinal movement relative to at least one of the engagement sections whereby to reduce the stress experienced by the mid-sections when in regions of high curvature.

14. The pipe curvature sensing device as claimed in claim 1, wherein the engagement sections engage the pipe over a length at least equal to the diameter of the pipe.

15. The pipe curvature sensing device as claimed in claim 1, wherein the curvature sensing device further comprises a plurality of pipe interface pieces which provide the surface of the curvature sensing device that engages the pipe.

16. The pipe curvature sensing device as claimed in claim 15, wherein the curvature sensing device comprises at least two pipe interface pieces on each engagement section.

17. The pipe curvature sensing device as claimed in claim 15 or 16, wherein at least one of the interface pieces comprises a wheel, ball bearing or other low friction component.

18. The pipe curvature sensing device as claimed in claim 15, wherein at least one of the interface pieces is configured to resiliently bias the curvature sensing device against a surface of the pipe.

19. The pipe curvature sensing device as claimed in claim 18, wherein four interface pieces are provided and the interface pieces are substantially equally spaced and arranged in two sets of opposing pairs, one interface of each pair being configured to resiliently bias the curvature sensing device against a surface of the pipe.

20. The pipe curvature sensing device as claimed in claim 1, wherein the curvature sensing device comprises at least one further sensing device, which measures the location and/or the orientation of the curvature sensing device, in absolute or relative terms.

21. The pipe curvature sensing device as claimed in claim 1, wherein the curvature sensing device comprises at least two parts which are mutually releasably attachable to secure the sensing device around the outside of the pipe.

22. The pipe curvature sensing device as claimed in claim 1, wherein the curvature sensing device is intended for use around the outside of the pipe, and encloses less than the complete cross-sectional perimeter of the pipe.

23. The pipe curvature sensing device as claimed in claim 1, wherein the pipe is a pipeline or cable.

24. The pipe curvature sensing device as claimed in claim 1, wherein the curvature sensing device is adapted for use with underwater pipes or cables.

25. The pipe curvature sensing device as claimed in claim 1, wherein the curvature sensing device further comprise fixing means adapted to fix the device to the pipe at a desired location.

26. A method for measuring the curvature of a pipe, the method comprising:
providing at least one curvature sensing device comprising at least two engagement sections which are adapted to substantially tangentially engage a pipe and are joined by at least one mid-section adapted to bend with the pipe, the first and second strain sensors being mechanically coupled to the mid-section in generally orthogonal planes and having their measurement axes arranged generally lengthways along the mid-section, wherein the flexible piece is adapted for insertion into or fastening around the pipe and for movement along an elongate structure, such that it will flex as the curvature of the pipe changes; and causing relative movement between the curvature sensing device and the pipe and measuring a signal from the strain sensors indicative of the strain on the strain sensors due to the flexing of the flexible piece.

27. A method as claimed in claim 26, wherein the method further comprises causing the said relative movement and measuring the signals from the strain sensors to determine the position of maximum curvature of the pipe, fixing the location of the curvature sensing device at the position of maximum curvature and measuring the signals from the strain sensors to monitor the curvature of the pipe at the position of maximum curvature.

28. A method as claimed in claim 26, further comprising measuring the position of the pipe and the first and second strain sensors.

* * * * *